(12) United States Patent
Ochi et al.

(10) Patent No.: US 10,109,830 B2
(45) Date of Patent: Oct. 23, 2018

(54) BATTERY SYSTEM

(71) Applicant: SANYO Electric Co., Ltd., Osaka (JP)

(72) Inventors: Shingo Ochi, Hyogo (JP); Hideaki Yano, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 142 days.

(21) Appl. No.: 15/029,019

(22) PCT Filed: Jan. 27, 2015

(86) PCT No.: PCT/JP2015/000337
§ 371 (c)(1),
(2) Date: Apr. 13, 2016

(87) PCT Pub. No.: WO2015/145927
PCT Pub. Date: Oct. 1, 2015

(65) Prior Publication Data
US 2016/0260946 A1   Sep. 8, 2016

(30) Foreign Application Priority Data
Mar. 25, 2014  (JP) ................... 2014-061505

(51) Int. Cl.
*H01M 2/10* (2006.01)
*H01M 10/613* (2014.01)
(Continued)

(52) U.S. Cl.
CPC ....... *H01M 2/1077* (2013.01); *H01M 10/613* (2015.04); *H01M 10/625* (2015.04);
(Continued)

(58) Field of Classification Search
CPC .......... H01M 10/625; H01M 10/6563; H01M 10/6557; H01M 10/613; H01M 2/1077; H01M 2220/20
See application file for complete search history.

(56) References Cited

U.S. PATENT DOCUMENTS

| | | |
|---|---|---|
| 2012/0028097 A1 | 2/2012 | Oury |
| 2014/0268521 A1* | 9/2014 | Kawai ............... H05K 5/061 361/679.01 |

(Continued)

FOREIGN PATENT DOCUMENTS

| | | |
|---|---|---|
| CN | 102347460 | 2/2012 |
| JP | 8-264170 | 10/1996 |

(Continued)

OTHER PUBLICATIONS

International Search Report of PCT application No. PCT/JP2015/000337 dated Apr. 21, 2015.
(Continued)

*Primary Examiner* — Muhammad S Siddiquee
(74) *Attorney, Agent, or Firm* — Wenderoth, Lind & Ponack, L.L.P.

(57) ABSTRACT

A battery system includes: stacked battery cells; spacers defining cooling gaps between the battery cells; a battery stacked block having openings of the cooling gaps on respective side surfaces thereof; end plates at respective ends of the battery stacked block; binding bars having blowing openings configured to communicate with the openings of the cooling gaps; and film-molded packings, each of the film-molded packings being formed from a resin film. Each of the film-molded packings is between one of the binding bars and the battery stacked block, and each of the film-molded packings has a flat surface portion in contact with an inner surface of one of the binding bars in a surface contact state, and an elastic protrusion of a hollow shape
(Continued)

which protrudes from the flat surface portion to a surface of the battery stacked block, extending so as to surround one of the blowing openings.

5 Claims, 9 Drawing Sheets

(51) Int. Cl.
*H01M 10/6557* (2014.01)
*H01M 10/6563* (2014.01)
*H01M 10/625* (2014.01)

(52) U.S. Cl.
CPC ... *H01M 10/6557* (2015.04); *H01M 10/6563* (2015.04); *H01M 2220/20* (2013.01)

(56) References Cited

U.S. PATENT DOCUMENTS

| | | | |
|---|---|---|---|
| 2014/0295227 A1* | 10/2014 | Aoki | H01M 2/1016 429/82 |
| 2015/0114870 A1* | 4/2015 | Fujino | B65D 81/025 206/503 |
| 2016/0008800 A1* | 1/2016 | Iwamoto | B01J 20/22 252/188.28 |

FOREIGN PATENT DOCUMENTS

| | | |
|---|---|---|
| JP | 11-220281 | 8/1999 |
| JP | 2005-056499 | 3/2005 |
| JP | 2006-286547 | 10/2006 |
| JP | 2014-036001 | 2/2014 |
| TW | 201406622 | 2/2014 |
| WO | 2012/173069 | 12/2012 |
| WO | 2013/073046 | 5/2013 |

OTHER PUBLICATIONS

English Translation of Chinese Search Report dated Jun. 12, 2018 in Chinese Patent Application No. 201580002962.3.

\* cited by examiner

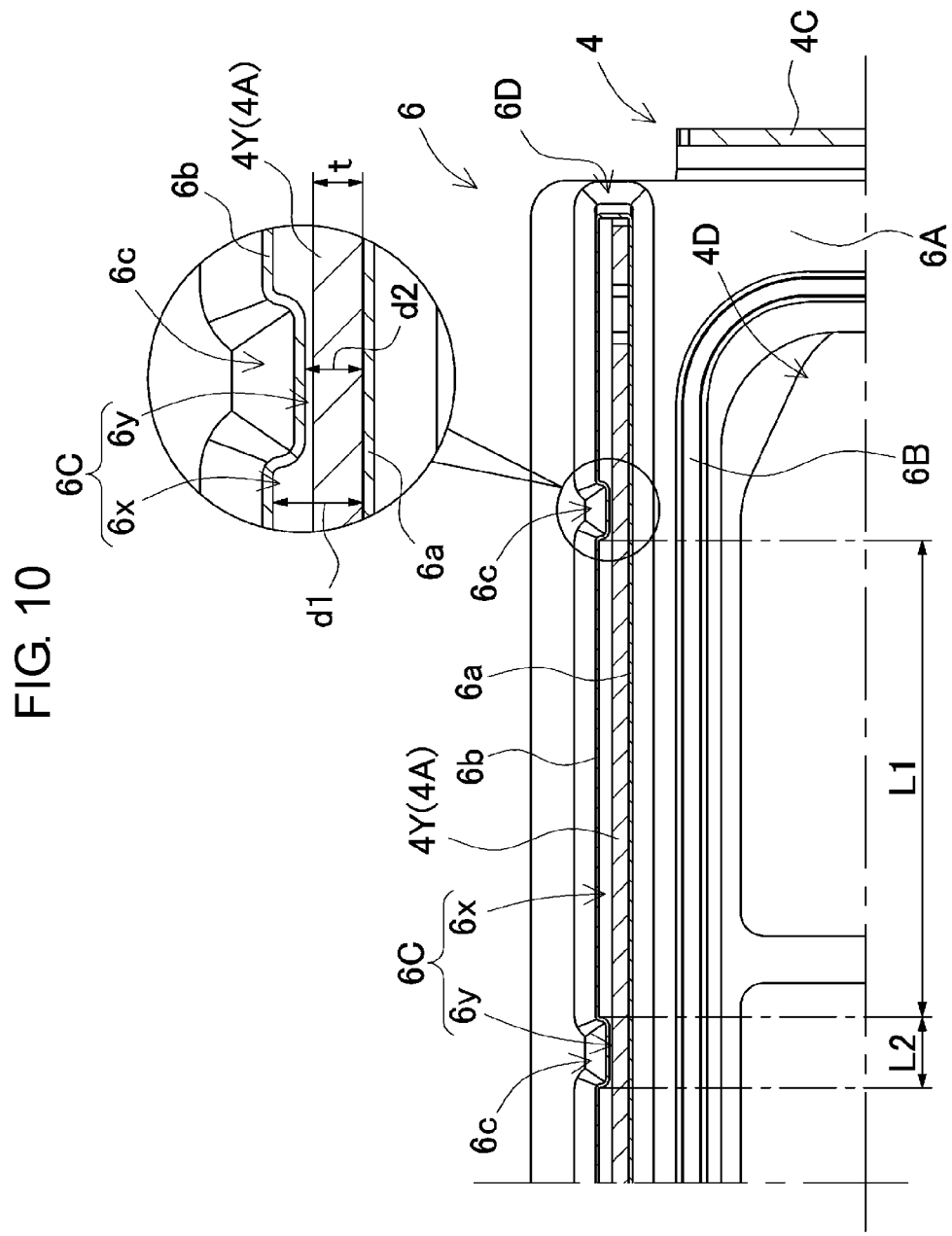

BATTERY SYSTEM

TECHNICAL FIELD

The present invention relates to a battery system. The battery system includes a battery stacked block having a plurality of battery cells stacked, and cooling gaps between the battery cells constituting the battery stacked block. The battery cells are cooled with cooling gas forcibly blown into the cooling gaps between the battery cells.

BACKGROUND ART

In a battery system, the output voltage can be increased by connecting a lot of battery cells in series, and the charge/discharge current can be increased by connecting the battery cells in parallel. Therefore, in the battery system for large current, high voltage used in a hybrid car or an electric vehicle, a plurality of battery cells are connected in series to increase the output voltage. Since the battery system used in this type of a use generates heat by charge or discharge with large current, it is necessary to forcibly cool the battery cells. In order to realize this, the battery system is developed which includes a battery stacked block having a plurality of battery cells stacked, and cooling gaps between the battery cells (Japanese Patent Publication No. 2006-286547).

In this battery system, a battery stacked block is made by stacking the plurality of the battery cells such that spacers are held between the battery cells so as to form cooling gaps. A cooling gas such as air is blown to the cooling gaps, and then the battery cells are cooled from their surfaces. Therefore, in this battery system, a lot of the stacked battery cells can be cooled by the cooling gas such as air blown to the cooling gaps.

SUMMARY OF THE INVENTION

In the battery system of Japanese Patent Publication No. 2006-286547, binding bars are disposed at both sides of the battery stacked block. Then, the cooling gas is supplied to the cooling gaps through one of the binding bars, and is exhausted outside through the other of the binding bars. In this battery system, the binding bar has a blowing opening which penetrates the binding bar in order to blow the cooling gas to the cooling gaps through the binding bar.

In the above-mentioned battery system, the cooling gas is blown by a blower installed in the vehicle, and passes through the blowing opening of the binding bar. Then, the cooling gas flows into each of the gaps in the battery stacked block. However, in this battery system, there is a problem that a gap or space is formed between the binding bar and the battery stacked block. In the battery stacked block, a lot of the battery cells are stacked, and the spacers are held between the battery cells, and then the battery cells and the spacers are stacked. The binding bar cannot airtightly contact the battery stacked block due to manufacturing allowance of the battery cells or spacers. The air leaks through the gap formed between the binding bar and the battery stacked block, and such a gap hinders efficient cooling of the battery cells by the cooling gas forcibly blown.

SUMMARY OF THE INVENTION

The present invention is developed for the purpose of solving such a problem. The purpose of the present invention provides a battery system that battery cells are efficiently cooled with cooling gas efficiently blown into cooling gaps between the battery cells.

Further, another purpose of the present invention provides a battery system that a packing is disposed at a fixed position without misalignment, while a film-molded packing is used as the packing for easy or inexpensive mass production, and can reduce gas leakage between the binding bar and the battery stacked block.

A battery system of the present invention comprises: a battery stacked block 2 having a plurality of battery cells 1 stacked in one direction, and spacers 5 forming a plurality of cooling gaps 26 between the adjacent battery cells 1, the plurality of the cooling gaps 26 having openings on both side surfaces of the battery stacked block 2; a pair of end plates 3 disposed at both ends of the battery stacked block 2 in a stacked direction in which the plurality of the battery cells 1 are stacked; binding bars 4 disposed at both side surfaces of the battery stacked block 2, and connected to the pair of the end plates 3 at both ends thereof, and having blowing openings 4D which communicates with at least a part of the openings of the cooling gaps 26. Further the battery system has film-molded packings 6X each formed from a resin film. The film-molded packings 6X are each disposed between each of the binding bars 4 and the battery stacked block 2. The film-molded packings 6X each have a flat surface portion 6A tightly contacting an inner surface of each of the binding bars 4 in a surface contacting state, and an elastic protrusion 6B of a hollow shape which protrudes from the flat surface portion 6A to a surface of the battery stacked block 2, extending so as to surround each of the blowing openings 4D.

The above-mentioned battery system has a feature that battery cells are efficiently cooled with a cooling gas efficiently blown into the cooling gaps between the battery cells. It is a reason why the battery system has film-molded packings each formed from a resin film and each disposed between each of the binding bars and the battery stacked block, and the film-molded packings each have a flat surface portion tightly contacting an inner surface of each of the binding bars in a surface contacting state, and an elastic protrusion of a hollow shape which protrudes from the flat surface portion to a surface of the battery stacked block, extending so as to surround each of the blowing openings. In the battery system, as the flat surface portion of the film-molded packing tightly contacts the inner surface of the binding bar, and the elastic protrusion resiliently contacts the surface of the battery stacked block, leakage of the gas blown to the blowing opening can be prevented, and the battery cells are efficiently cooled with a cooling gas efficiently blown into the cooling gaps between the battery cells.

Further, in the battery system, the film-molded packing is disposed at the fixed position without misalignment, while the film-molded packing is used as the packing for easy or inexpensive mass production, and can efficiently prevent gas leakage between the binding bar and the battery stacked block. It is a reason why the flat surface portion of the film-molded packing made of the resin film, tightly contacts the inner surface of the binding bar, and is disposed at the fixed position in the battery system. Especially, in the film-molded packing, as the elastic protrusion of the hollow shape can be resiliently and largely deformed, even though the gaps between the binding bar and the battery stacked block become wide or partially change, the elastic protrusion can tightly contact the surface of the battery stacked block. Thus, it can efficiently prevent gas leakage to the outside.

In the battery system of the present invention, the binding bars 4 each have a side surface plate 4X which is disposed to face each of the side surfaces of the battery stacked block 2, and the side surface plate 4X has a peripheral plate portion 4E which is disposed along a periphery of each of the side surfaces of the battery stacked block 2, and each of the blowing openings 4D which is disposed at a center side of the peripheral plate portion, and the flat surface portion 6A of each of the film-molded packings 6X tightly contacts an inner surface of the peripheral plate portion 4E.

In the battery system, the peripheral plate portion of the binding bar is disposed along the periphery of the side surface of the battery stacked block, and the film-molded packing tightly contacts the inner surface of the peripheral plate portion, and the gas is blown to the blowing opening provided at the center side of the peripheral plate portion. Therefore, the blowing opening provided at the side surface of the battery stacked block is large, the gas blown to the blowing opening can be blown into each of the cooling gaps. Thus, in the simple structure, by forcibly blowing the gas into the cooling gaps, the battery cells can be cooled.

In the battery system of the present invention, the binding bars 4 each have a side edge 4Y projecting from the side surface plate 4X toward the battery stacked block 2, and the film-molded packings 6X each have a guide groove 6C where the side edge of each of the binding bars 4 is inserted, and the flat surface portion 6A of each of the film-molded packings 6X is disposed at the peripheral plate portion 4E with the side edge 4Y of each of the binding bars 4 inserted in the guide groove 6C.

In the battery system, the film-molded packing is precisely disposed at the location of the binding bar without misalignment. Thus, it can efficiently prevent leakage of the gas blown to the blowing opening. In the usage with the elapse of time, positional slippage of the film-molded packing with time can be prevented. Then, the gas forcibly blown to the blowing opening does not leak outside over a long period, and the battery cells can be cooled with the gas efficiently blown into the cooling gaps.

In the battery system of the present invention, the guide groove 6C includes a positioning groove portion 6x having a predetermined width, and a fitting groove portion 6y having a narrower width than a width of the positioning groove portion 6x, and the fitting groove portion 6y resiliently holds the side edge 4Y of each of the binding bars 4.

In the battery system, the side edge of the binding bars is easily inserted the guide groove for positioning, and can be precisely disposed at the location of the guide groove without misalignment. It is a reason why the guide groove of the film-molded packing includes the positioning groove portion having the predetermined width, and the fitting groove portion having the narrower width than the width of the positioning groove portion, and then the side edge of the binding bar is resiliently clamped by the fitting groove portion for positioning. In the film-molded packing, as the positioning groove portion of the guide groove has the predetermined width, the side edge of the binding bar can be smoothly inserted into the guide groove. Then, as the fitting groove portion has the narrower width than the width of the positioning groove portion, the side edge of the binding bar inserted into the guide groove is resiliently clamped by the fitting groove portion for precisely positioning.

In the battery system of the present invention, the film-molded packings 6X are each made such that a sheet of a resin film is molded.

In the battery system, as the film-molded packing is made such that the one sheet of the resin film is molded, the film-molded packing is made in easy or inexpensive mass production. Then, the film-molded packing is molded in the sheet shape coupling the flat surface portion tightly contacting the inner surface of the binding bar in the surface contacting state and the elastic protrusion extending so as to surround the blowing opening, leakage of the gas can be prevented such that the film-molded packing surely, tightly contacts the inner surface of the binding bar and the surface of the battery stacked block.

BRIEF DESCRIPTION OF DRAWINGS

FIG. 10 is a partial enlarged sectional view showing a state where a side edge of the binding bar is inserted into a guide groove of the packings.

DESCRIPTION OF EMBODIMENTS

Figure 1:
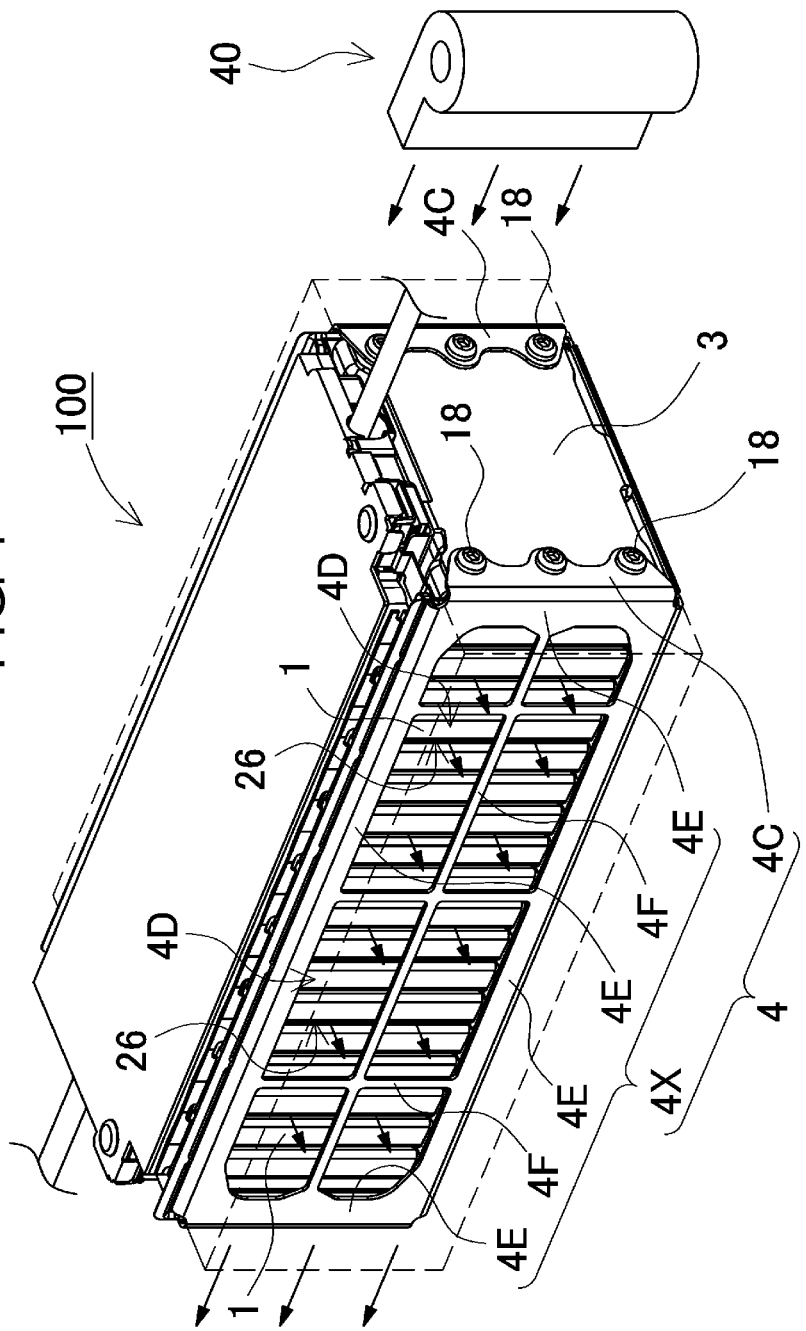
FIG. 1 is a perspective view of a battery system relating to one embodiment of the present invention.

Hereinafter, the embodiment of the present invention will be described referring to drawings. However, the following embodiments illustrate a battery system which is aimed at embodying the technological concept of the present invention, and the present invention is not limited to the battery system described below. However, the members illustrated in Claims are not limited to the members in the embodiments.

Battery system 100 shown in FIG. 1 to FIG. 5, includes: battery stacked block 2 in which a plurality of battery cells 1 are stacked; a pair of end plates 3 disposed at both ends of battery stacked block 2 in a stacked direction of battery stacked block 2; resilient plate 9 disposed under battery stacked block 2; binding bars 4 connected to the pair of end plates 3 at both ends thereof, and fixing battery cells 1 of battery stacked block 2 in a state where battery cells 1 are pressed in the stacked direction, and disposing resilient plate 9 under battery stacked block 2; blower 40 for cooling battery cells 1 by forcibly blowing cooling gas into blowing opening 4D of binding bar 4; and packing 6 disposed between binding bar 4 and battery stacked block 2.

In the above-mentioned battery system 100, resilient plate 9 is disposed at the bottom surface of battery stacked block 2, terminal surface 1A of each of battery cell 1 is disposed in the same plane. The battery system of the present invention does not necessarily dispose the resilient plate at the bottom surface of the battery stacked block.

Figure 6:
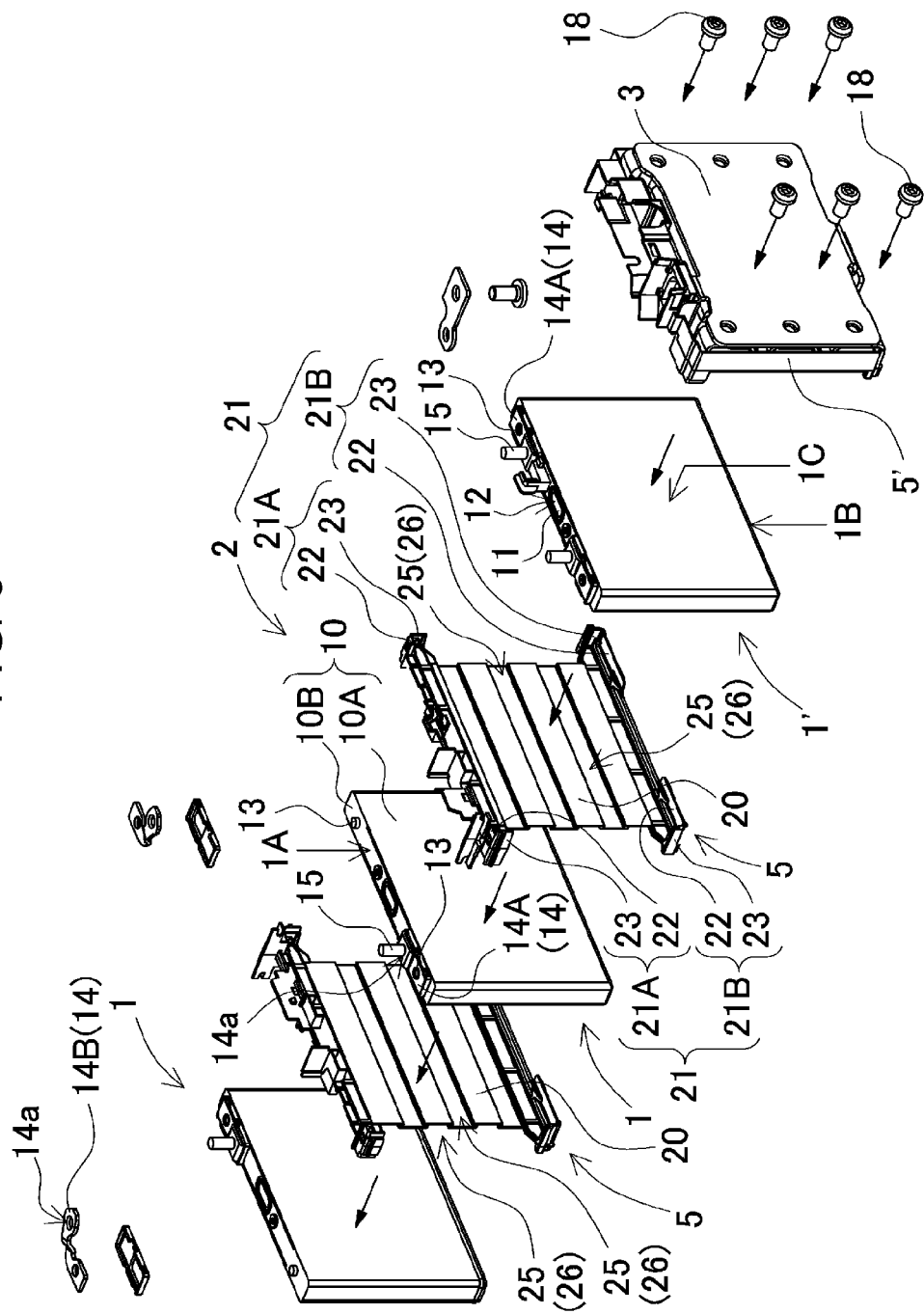
FIG. 6 is an exploded perspective view showing stacked structure of battery cells and spacers.

As shown in FIG. 6, battery cell 1 is a flat secondary battery having a width larger than a thickness, and having facing flat surfaces 1C of a quadrangle. Stacked battery cells 1 in the thickness direction, constitute battery stacked block 2. Battery cell 1 is a non-aqueous electrolyte battery having battery case 10 of a metal case. Battery cell 1 of the non-aqueous electrolyte battery is a lithium ion secondary battery. While, any secondary battery such as a nickel hydride battery, a nickel cadmium battery can be applied to the battery cell. Battery cell 1 shown in the figures, has an outer shape of the quadrangle. Battery cells 1 are stacked with surfaces of the quadrangles facing each other, to constitute battery stacked block 2.

Battery cell 1 includes metal battery case 10 having facing flat surfaces 1C of the quadrangle. Battery case 10 stores an electrode assembly (not shown in the figures), and then is filled up with electrolyte. Metal battery case 10 is made of aluminum or aluminum alloy. Battery case 10 includes outer can 10A which is of a pipe shape having a bottom and a top opening portion by press processing of metal board, and sealing plate 10B which airtightly is fitted to the top opening portion of outer can 10A. Sealing plate 10B is a flat metal board, and its outer shape coincides with the inner shape of the top opening portion of outer can 10A. Sealing plate 10B is inserted into the inside of the top opening portion of outer can 10A without gaps, and is welded to outer can 10A by irradiating laser to between sealing plate 10B and the inside of outer can 10A.

Positive and negative electrode terminals 13 are fixed at both ends of sealing plate 10B. Here, terminal surface 1A of battery cell 1 is sealing plate 10B, and bottom surface 1B is an undersurface of battery cell 1 opposite to terminal surface 1A in FIG. 6. Further, in sealing plate 10B, gas exhaust vent 12 is provided in the middle of positive and negative electrode terminals 13. Inside gas exhaust vent 12, exhaust valve 11 is provided which opens at a preset inner pressure. In battery stacked block 2, the plurality of battery cells 1 are stacked in a posture where electrode surfaces 1A are located in the same plane.

In battery stacked block 2, bus-bars 14 of metal boards are fixed to positive and negative electrode terminals 13 of adjacent battery cells 1, and then bus-bars 14 connect battery cells 1 in series each other. Here, in the battery stacked block, the battery cells can be connected in series and/or parallel. In the battery system, the output voltage can be increased by connecting the adjacent battery cells in series, and the charge/discharge current can be increased by connecting the adjacent battery cells in parallel. In battery stacked block 2 shown in FIG. 6, linear bus-bars 14A and L-shaped bus-bars 14B are fixed to electrode terminals 13 of battery cells 1 by welding. The tips of linear bus-bars 14A and L-shaped bus-bars 14B are overlapped to each other, and through-holes 14a are provided at the overlapped portions. Then, screws 15 are inserted into through-holes 14a, and screws 15 are screwed into nuts 16, and then bus-bars 14 are fixed to each other.

In battery stacked block 2 shown in FIG. 6, spacers 5 are clamped between the plurality of battery cells 1. In battery stacked block 2 shown in the figures, adjacent battery cells 1 are arranged in reverse postures such that adjacent electrode terminals 13 are opposite polarities. Then, adjacent electrode terminals 13 at both edges thereof are coupled to each other by bus-bars 14. Thus, adjacent battery cells 1 are connected in series, and then all battery cells 1 are connected in series. Here, the present invention does not specify the number of the battery cells constituting battery stacked block, their connecting states.

Spacers 5 are clamped between adjacent battery cells 1, and then have cooling gaps 26. Further, spacers 5 made of insulating plastic are molded, and insulate adjacent battery cells 1 from each other. Spacers 5 are disposed so as to contact flat surfaces 1C of adjacent battery cells 1, and each of spacers 5 has plate portion 20 clamped between battery cells 1 and peripheral cover portions 21 disposed on the peripheral surfaces of battery cells 1. Then, plate portion 20 and peripheral cover portions 21 are integrally molded. Spacer 5 has a shape where battery cells 1 are disposed at a fixed position inside peripheral cover portions 21, and thereby battery cells 1 can be stacked without misalignment.

As mentioned above, as battery cells 1 are stacked so as to be insulated by spacers 5, outer can 10A of battery cell 1 can be made of metal such as aluminum. Here, the battery stacked block does not necessarily need spacers interposed between battery cells. For example, the outer can (case) of the battery cell is made of insulating material, or the outer surface of outer can of the battery cell is covered with insulating sheet or paint, and thereby such configuration insulates adjacent battery cells from each other. Therefore, spacers are not needed.

Figure 3:
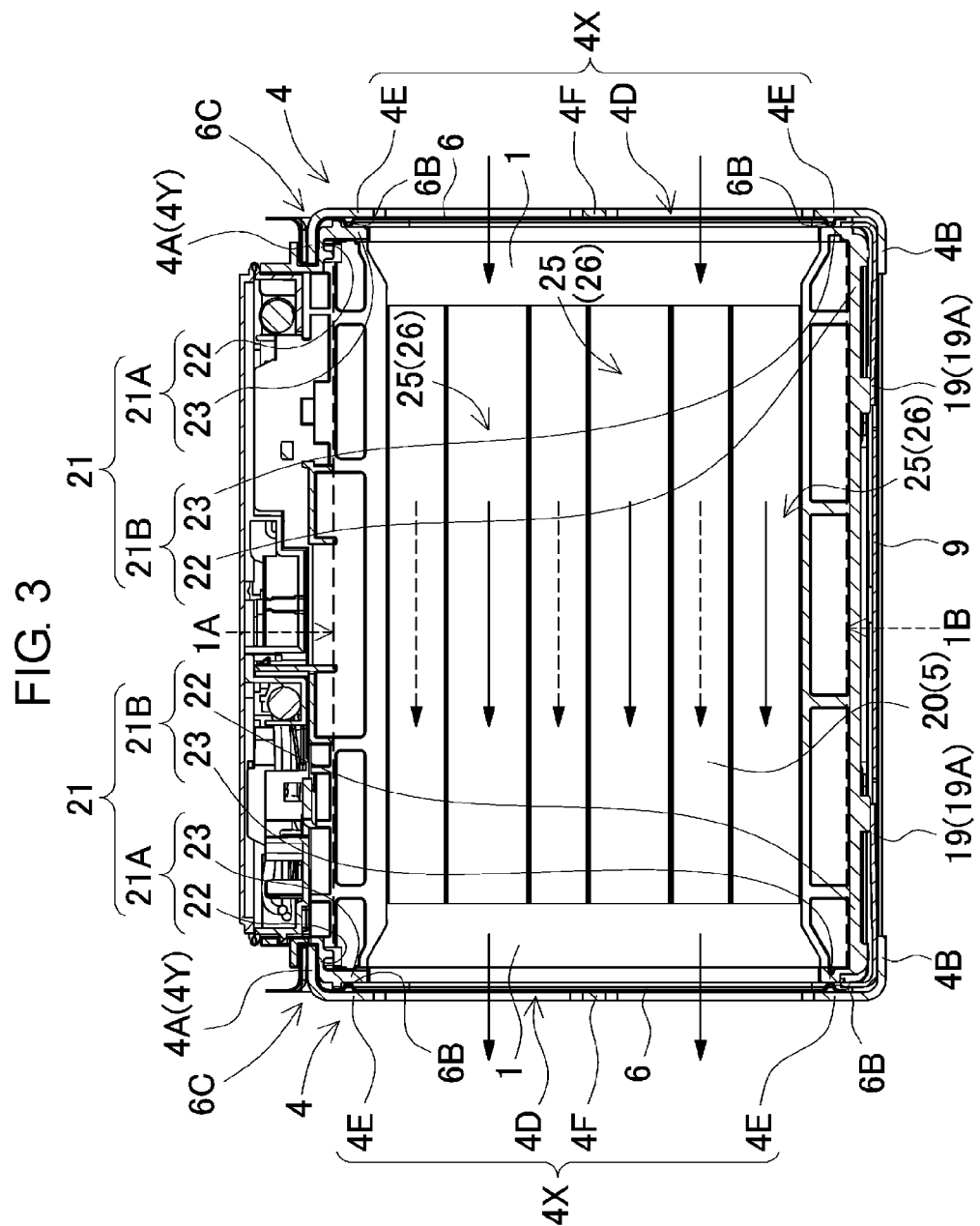
FIG. 3 is a vertical lateral sectional view of the battery system shown in FIG. 1.

In spacer 5 shown in FIG. 3 and FIG. 6, cooling gaps 26 are provided where cooling gas such as air passes, at plate portion 20 clamped between battery cells 1, in order to effectively cool battery cells 1. Plate portion 20 of spacer 5 shown in FIG. 6, is molded in zigzag shape, and thereby a plural parallel-lines of cooling gaps 26 are provided between flat surfaces 1C of battery cells 1. Cooling gaps 26 have openings on both side surfaces of battery stacked block 2, and the cooling gas supplied from the one side surface, is exhausted to the opposite side surface, to cool battery cells 1. This spacer 5 has the plural lines of grooves 25, and this configuration provides cooling gaps 26 between battery cells 1. Spacer 5 in the figures has the plurality of grooves 25 which are provided in parallel each other at a preset interval. Plate portion 20 in the figures has grooves 25 on both surfaces thereof, and has cooling gaps 26 between adjacent battery cells 1 and spacer 5. This structure can effectively cool battery cells 1 at both sides of plate portion 20 by cooling gaps 26 formed at both surfaces of plate portion 20. Here, the spacer can also have grooves on only the one surface, and the cooling gaps can be provided between the battery cell and the spacer. The air forcibly blown into cooling gaps 26, can effectively, directly cools outer cans 10A of battery cells 1.

In spacer 5 mentioned above, cooling gaps 26 are provided where the cooling gas such as the air is forcibly blown, and then battery cells 1 are cooled. The cooling gas is blown into cooling gaps 26 through blowing opening 4D provided at binding bar 4. Binding bars 4 are disposed at both sides of battery stacked block 2. Then, the cooling gas passes through blowing opening 4D of one binding bar 4, and flows into cooling gaps 26. Then, the cooling gas cools battery cells 1 while passing through blowing gaps 26, and then is exhausted outside through blowing opening 4D of other binding bar 4.

Spacer 5, shown in FIG. 3 to FIG. 6, has first peripheral cover portions 21A at the upper portion thereof, that is, at terminal surface 1A side of battery cell 1, and second peripheral cover portions 21B at the bottom surface side of battery cell 1. First peripheral cover portion 21A has horizontal portion 22 which covers terminal surfaces 1A of battery cells 1, and vertical portion 23 which covers the upper portion of each side surface of battery cells 1. Second peripheral cover portion 21B has horizontal portion 22 which covers bottom surfaces 1B of battery cells 1, and vertical portion 23 which covers the lower portion of each side surface of battery cells 1.

Horizontal portion 22 of first peripheral cover portion 21A, is disposed outside and on terminal surface 1A, and is sandwiched between first engaging portion 4A of binding bar 4 and terminal surface 1A of battery cell 1, and then tightly contacts first engaging portion 4A at the upper surface thereof and terminal surface 1A at the undersurface thereof. First engaging portion 4A of binding bar 4 presses terminal surface 1A via first peripheral cover portion 21A, and thereby terminal surfaces 1A of battery cells 1 are disposed in the same plane. Horizontal portion 22 of second peripheral cover portion 21B, is disposed under bottom surface 1B of battery cell 1, and is sandwiched between bottom surface 1B of battery cell 1 and resilient arm 19A of resilient plate 9, and then tightly contacts bottom surface 1B of battery cell 1 and the undersurface thereof is pressed by resilient arm 19A. Resilient arm 19A presses bottom surface 1B of battery cell 1 upward via horizontal portion 22 of second peripheral cover portion 21B, and thereby terminal surfaces 1A of battery cells 1 are disposed in the same plane.

Figure 7:
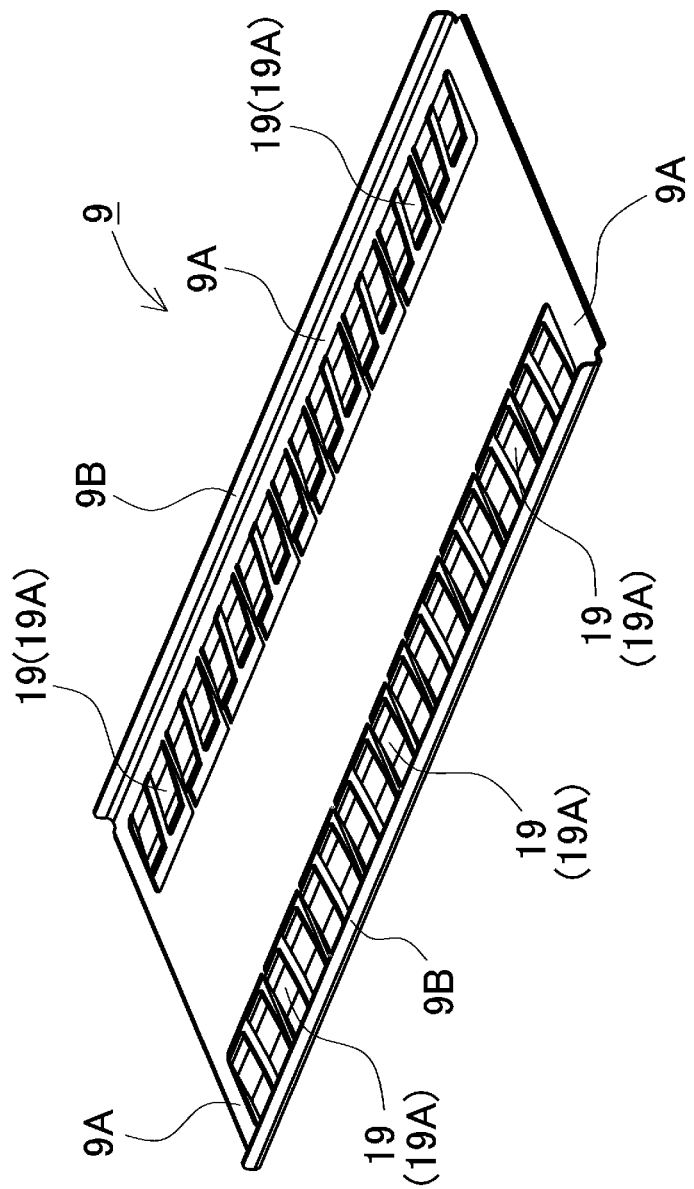
FIG. 7 is a perspective view of a resilient plate.

Resilient plate 9 is disposed at bottom surfaces 1B of battery cells 1, and has resiliently pressing portions 19 which each press battery cell 1 from bottom surface 1B toward terminal surface 1A resiliently. Resilient plate 9 shown in FIG. 7, is made of metal board such as stainless, which is able to be resiliently deformed. The plurality of resilient arms 19A as resiliently pressing portions 19 are integrally made with resilient plate 9 by cutting or pressing the metal board. Further, in resilient plate 9 of FIG. 7, a pair of resilient arms 19A extend in a longitudinal direction of bottom surface 1B of battery cell 1. The pair of resilient arms 19A are coupled to both side portions of resilient plate 9, and extend from both side portions of resilient plate 9 toward the center portion of resilient plate 9. Resilient plate 9 shown in the figures, includes peripheral frame portion 9A having a rectangular shape along the outer shape of the bottom surface of battery stacked block 2. The plurality of resilient arms 19A are integrally provided so as to extend from both side portions of this peripheral frame portion 9A toward the inside. Resilient arm 19A is bent such that the tip of resilient arm 19A projects toward bottom surface 1B of battery cell 1. The pair of resilient arms 19A provided at both side portions of resilient plate 9, press bottom surface 1B of one battery cell 1. Therefore, the plurality of resilient arms 19A are provided at both side portions of resilient plate 9 such that the interval of adjacent resilient arms 19A is the same as the interval of stacked battery cells 1.

Figure 5:
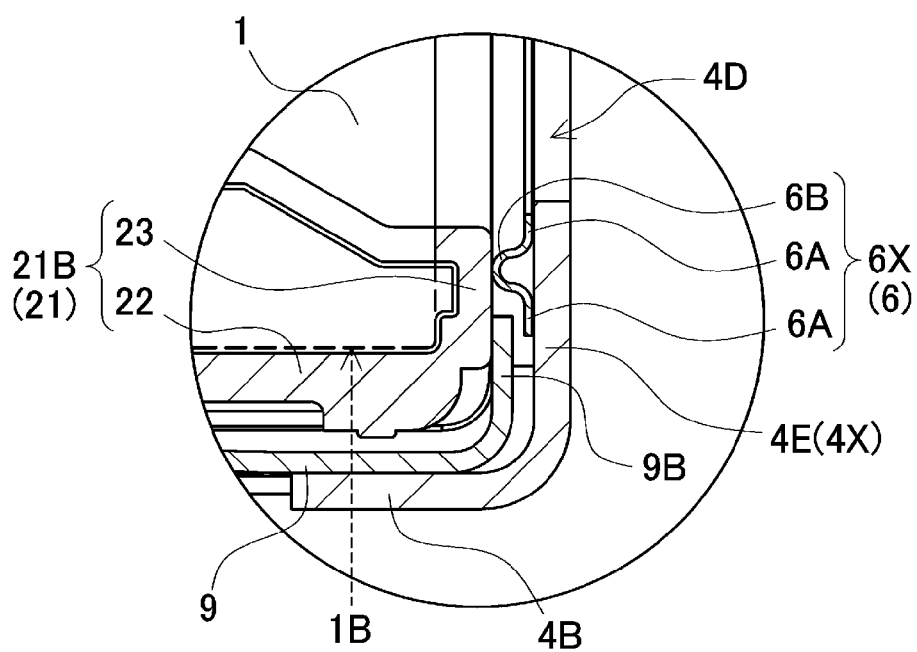
FIG. 5 is a main portion enlarged sectional view of the battery system shown in FIG. 3.

Further, resilient plate 9 shown in FIG. 3, FIG. 5, and FIG. 7, has reinforcing ribs 9B along both side portions of peripheral frame portion 9A. In resilient plate 9, reinforcing ribs 9B are made by bending both side edge portions of peripheral frame portion 9A upward. In resilient plate 9, reinforcing ribs 9B provided at both side edge portions thereof can enhance hardness of both side portions of peripheral frame portion 9A. This structure of resilient plate 9 can press battery cells 1 upward in a state where resiliently pressing portions 19 are resiliently deformed by pressing both side portions thereof, without both side portions of peripheral frame portion 9A deformed. Additionally, in resilient plate 9 shown in the figures, the inner surfaces of reinforcing ribs 9B provided at both side edges of peripheral frame portion 9A, contact the outside surfaces of the lower corner portions of battery stacked block 2. In resilient plate 9, reinforcing ribs 9B position and support the bottom surface of battery stacked block 2 at a fixed position in the right and left directions.

End plates 3 are coupled to each other by binding bars 4, and press battery stacked block 2 from both end surfaces thereof, and then press battery cells 1 in the stacked direction. End plates 3 fixed by binding bars 4, fix each of battery cells 1 in battery stacked block 2 in a pressed state with a predetermined binding pressure. The outer shape of end plate 3 is almost the same as, or slightly larger than the outer shape of battery cell 1. Binding bars 4 are coupled to four corners of end plates 3, and end plates 3 have board shapes of a quadrangle which are not deformed with battery stacked block 2 fixed in the pressed state. End plates 3 coupled to binding bars 4 at four corners thereof, fix battery cells 1 in the pressed state by an uniform pressure, while tightly contacting the surfaces of battery cells 1. In the battery system, end plates 3 are provided at both end portions of battery stacked block 2. Then, while end plates 3 at both ends are pressed by a press machine (not shown in the figures), held in the state where battery cells 1 are pressed in the stacked direction, and binding bars 4 are fixed to end plates 3 in this state, and then battery stacked block 2 is held and fixed at the predetermined pressure. After end plates 3 are coupled to binding bars 4, the pressure by the press machine is released.

Figure 2:
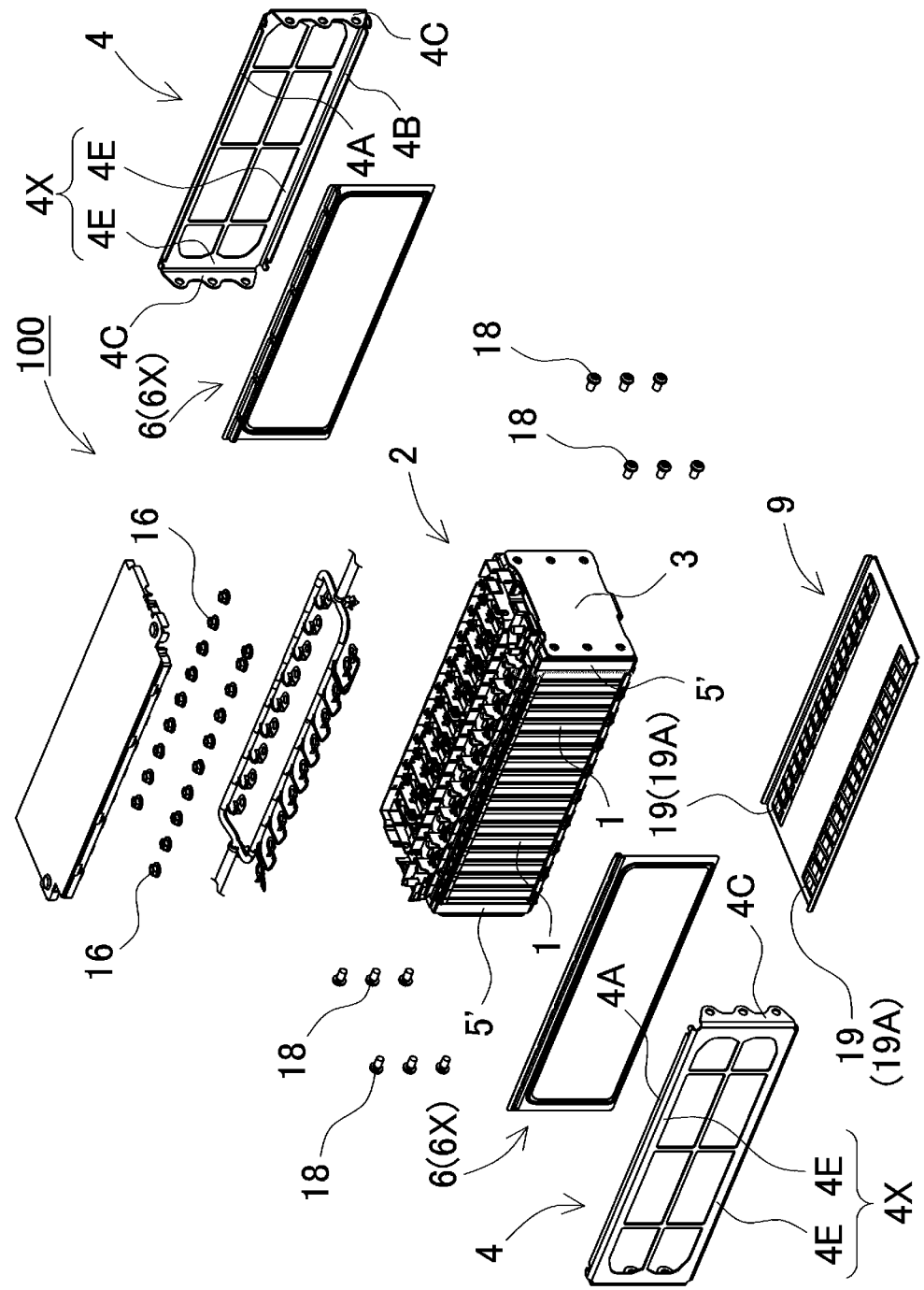
FIG. 2 is an exploded perspective view of the battery system shown in FIG. 1.

As shown in FIG. 1 and FIG. 2, binding bars 4 are coupled to end plates 3 at both ends of battery stacked block 2, and fix the plurality of battery cells 1 in the pressed state in the stacked direction. Binding bar 4 is made by pressing metal board. This binding bar 4 has side surface plate 4X which is disposed at the side surface of battery stacked block 2, and fixing portions 4C which are disposed at the outer end surfaces of end plates 3. Then, fixing portions 4C are fixed to the outer end surfaces of end plates 3 by screws 18.

Further, as shown in FIG. 3 to FIG. 5, FIG. 8 and FIG. 9, binding bar 4 has first engaging portion 4A which is disposed above terminal surface 1A of battery cell 1, and second engaging portion 4B which is disposed outside resilient plate 9. Battery stacked block 2 putting resilient plate 9 under bottom surface 1B, is disposed between first engaging portion 4A and second engaging portion 4B. In binding bars 4 in the figures, the top edge of side surface plate 4X is bent inside at a right angle to provide first engaging portion 4A, and the lower edge is bent inside at a right angle to provide second engaging portion 4B. Further, side surface plate 4X has blowing opening 4D at the inside except for the peripheral portion, and then the cooling gas can be blown through binding bar 4. As binding bar 4 has blowing opening 4D, the whole of binding bar 4 can be reduced in weight. In side surface plate 4X shown in FIG. 8 and FIG. 9, peripheral plate portion 4E having a quadrangle shape at the peripheral portion is coupled to coupling bars 4F longitudinally and laterally, and then is reinforced to provide blowing opening 4D inside peripheral plate portion 4E.

Figure 4:
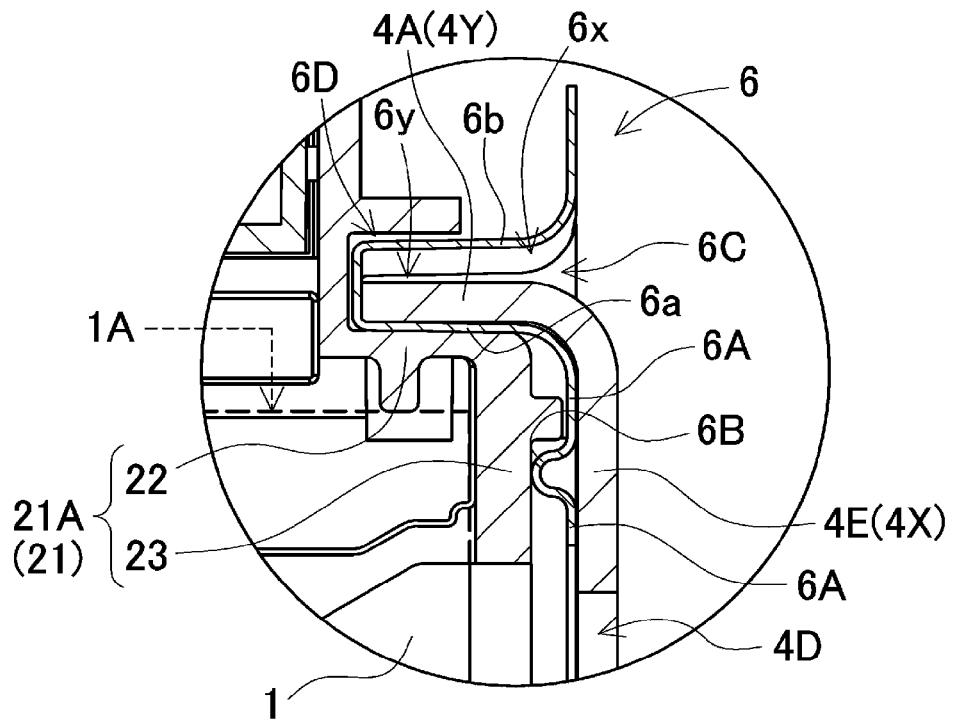
FIG. 4 is a main portion enlarged sectional view of the battery system shown in FIG. 3.

First engaging portion 4A of binding bar 4 has planar inner surface, and thereby terminal surfaces 1A of battery cells 1 are disposed in the same plane. As shown in FIG. 4, in battery system 100 of FIG. 3, horizontal portion 22 of peripheral cover portion 21 in spacer 5 is disposed at terminal surface 1A of battery cell 1. Therefore, in this battery system 100, horizontal portion 22 of first peripheral cover portion 21A is disposed so as to be clamped between terminal surface 1A and first engaging portion 4A. Terminal surfaces 1A of battery cells 1 are pressed to first engaging portion 4A via first peripheral cover portion 21A of spacer 5, and then are disposed in the same plane. In the battery system of the present invention, the peripheral cover portion of the spacer does not necessarily need to be disposed at the terminal surface of the battery cell. In this battery system, the terminal surface of the battery cell may be disposed so as to contact the inner surface of the first engaging portion of the binding bar, and then the terminal surfaces of the battery cells are disposed in the same plane. In this battery system, the engaging portion of the binding bar, or the terminal surface of the battery cell may be made of insulating material. Alternatively, stacked sheet or insulating film may be provided between the engaging portion of the binding bar and the terminal surface of the battery cell.

Second engaging portion 4B of binding bar 4 is located outside resilient plate 9, namely, under resilient plate 9 shown in FIG. 3 and FIG. 5, and presses resilient plate 9 upward, and holds resiliently pressing portions 19 of resilient plate 9 in a resiliently deformed state with resiliently pressing portions 19 crushed. Resilient plate 9 pressed to bottom surface 1B of battery stacked block 2 by second engaging portions 4B, presses battery cells 1 by resilience of resiliently pressing portions 19 resiliently deformed, and disposes terminal surfaces 1A of battery cells 1 in the same plane. In battery system 100 of FIG. 3, second peripheral cover portion 21B in spacer 5 is disposed between resilient plate 9 and bottom surface 1B of battery cell 1. Therefore, resiliently pressing portions 19 press battery cells 1 upward via second peripheral cover portion 21B of spacer 5, and dispose terminal surfaces 1A in the same plane.

A inner space between first engaging portion 4A and second engaging portion 4B of binding bar 4, is a size in which battery stacked block 2 with resilient plate 9 at bottom surface thereof are disposed, and resiliently pressing portion 19 of resilient plate 9 is resilient deformed with resiliently pressing portion 19 crushed. Horizontal portions 22 of peripheral cover portions 21 in spacer 5, are disposed between battery cell 1 and first engaging portion 4A or second engaging portion 4B in the battery system. The inner space between first engaging portion 4A and second engaging portion 4B, is a size in which battery stacked block 2 with resilient plate 9 at bottom surface thereof and with horizontal portions 22 of peripheral cover portions 21 vertically stacked are disposed, and resiliently pressing portion 19 of resilient plate 9 is resiliently deformed with resiliently pressing portion 19 crushed.

Figure 8:
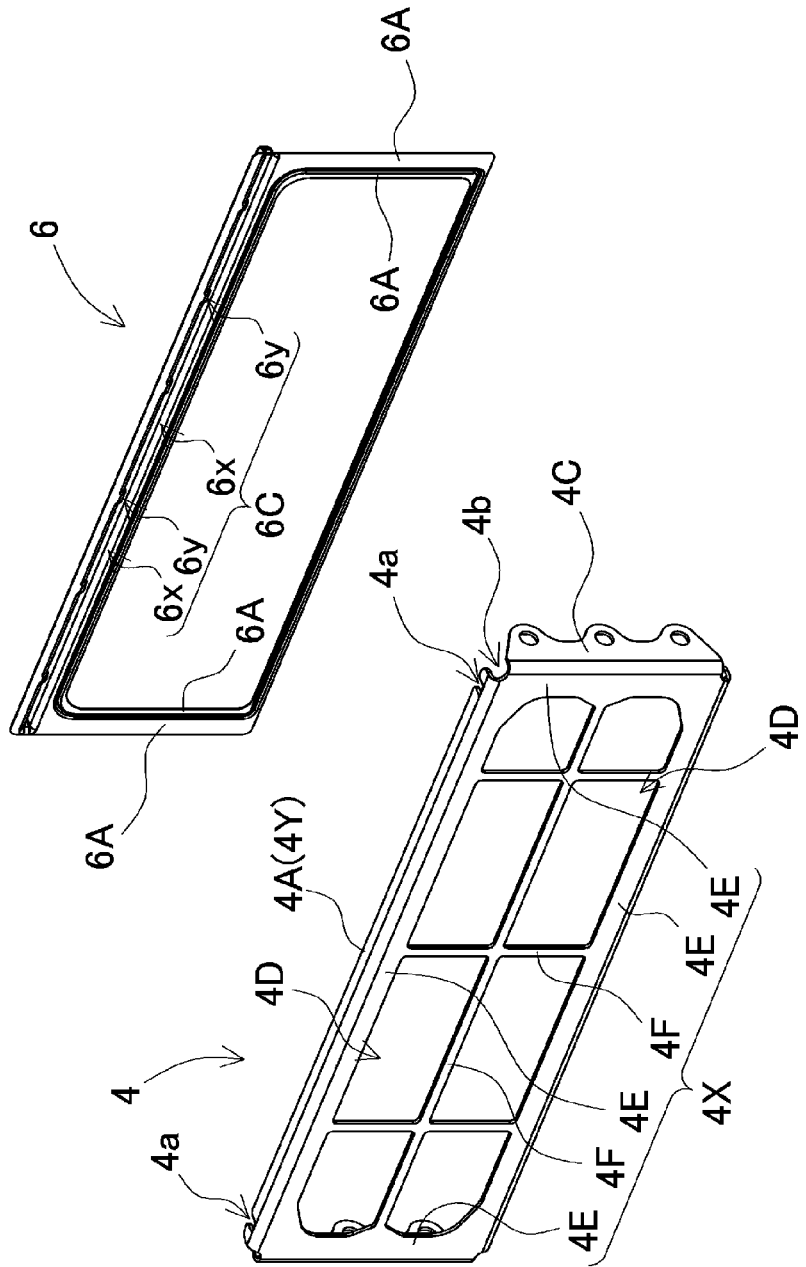
FIG. 8 is a perspective view of a binding bar and a packing.
Figure 9:
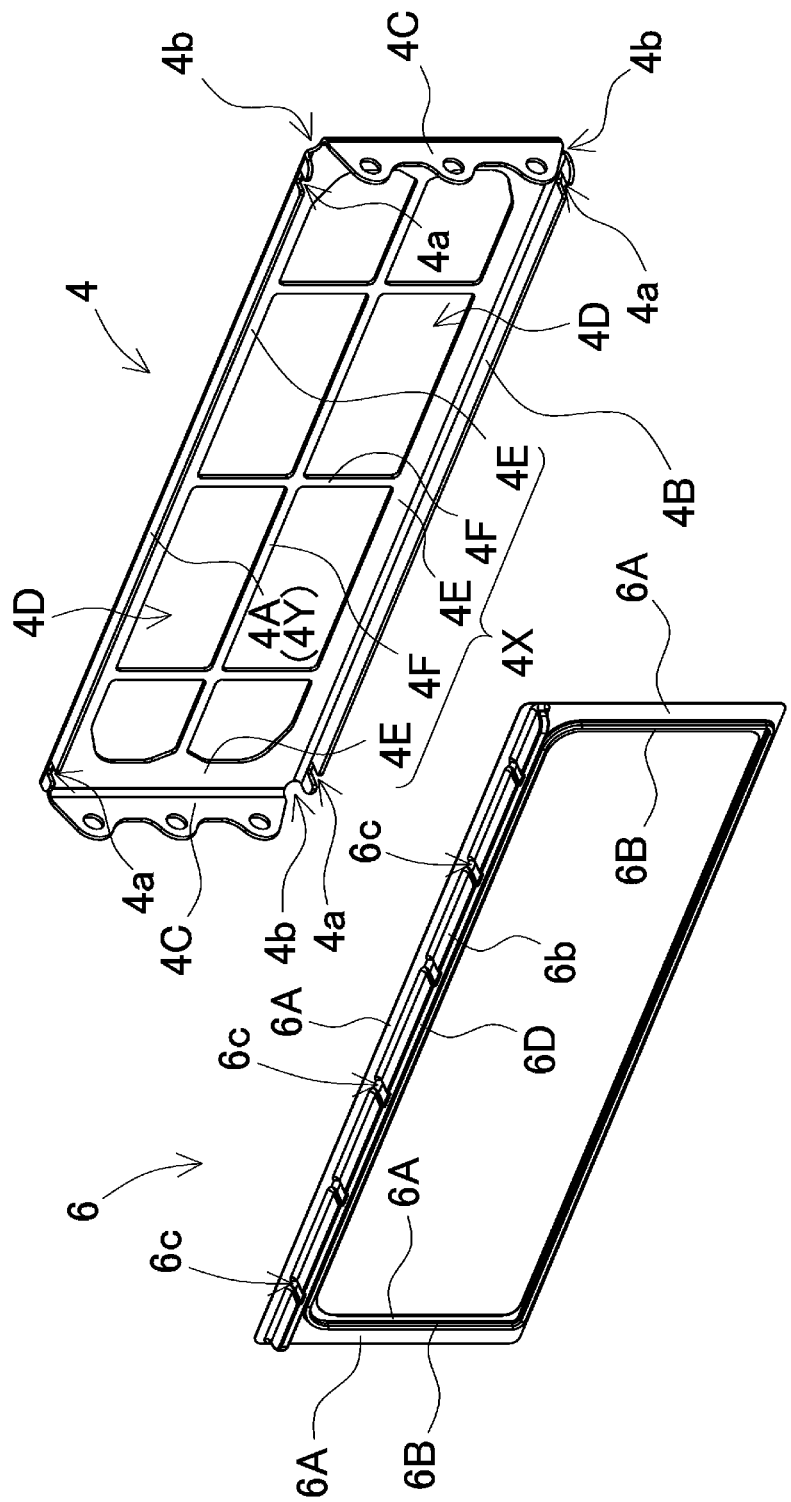
FIG. 9 is a perspective view of a binding bar and a packing.

Further, as shown in FIG. 8 and FIG. 9, binding bar 4 has cut-away portions 4a at first engaging portion 4A and second engaging portion 4B. Cut-away portions 4a are provided for guiding a jig. The jig holds resiliently pressing portions 19 in the crushed state when resilient plate 9 and battery stacked block 2 are inserted between first engaging portion 4A and second engaging portion 4B. Binding bar 4 has cut-away portions 4a at both of first engaging portion 4A and second engaging portion 4B. Binding bar 4 has cut-away portions 4a at both of first engaging portion 4A and second engaging portion 4B, but does not necessarily has the cut-away portions at both engaging portions, it may have the cut-away portions at one of them. It is the reason why the battery stacked block and the resilient plate are pressed by the jig, and the resiliently pressing portion is held in the crushed state by the jig, and the battery stacked block with the resilient plate stacked can be inserted between the first engaging portion and the second engaging portion, while the cut-away portions are guided by the jig.

Binding bar 4 shown in FIG. 8 and FIG. 9, has cut-away portions 4a at both end portions of each of engaging portions 4A, 4B. The jig where battery stacked block 2 is pressed and resiliently pressing portions 19 of resilient plate 9 are crushed via horizontal portions 22 of first peripheral cover portion 21A of spacer 5, is guided into cut-away portions 4a of first engaging portion 4A. The jig where resilient plate 9 are pressed and resiliently pressing portions 19 are crushed, is guided into cut-away portions 4a of second engaging portion 4B. Resiliently pressing portions 19 crushed by the jig, press battery stacked block 2 via second peripheral cover portions 21B of spacer 5.

Binding bar 4 mentioned above, has cut-away portions 4a located at end spacers 5' stacked at both ends of battery stacked block 2. These end spacers 5' are stacked between end plates 3 and endmost stacked battery cells 1' at both end portions of battery stacked block 2. Binding bar 4 having cut-away portions 4a at both end portions thereof, can disperse stresses concentrated at the corner portions of side surface plate 4X by cut-away portions 4a at both end portions, and prevents side surface plate 4X from being damaged, in a state where fixing portions 4C are fixed outside end plates 3. Since binding bar 4 shown in FIG. 8 and FIG. 9 has cut-away portions 4a at both end portions of first engaging portion 4A and second engaging portion 4B, stresses concentrated at the upper and lower corner portions of side surface plate 4X can be dispersed, and then damage at the four corners of side surface plate 4X can be prevented.

Further, as shown in FIG. 8 and FIG. 9, binding bar 4 has separating gaps 4b between fixing portions 4C and both of engaging portions 4A, 4B. This shape of binding bar 4 can be mass-produced at low cost by pressing metal board. Further, by cut-away portions 4a and separating gaps 4b provided at both of engaging portion 4A, 4B, stresses concentrated at the four corner portions of side surface plate 4X can be effectively dispersed, and then damage at these portions can be more effectively prevented.

Packing 6 is film-molded packing 6X which is vacuum-molded from one resin film and cut. Here, film-molded packing 6X can be also made in a predetermined three-dimensional shape of film by a method of injection molding using thermoplastic resin. A resin having an excellent heat resistance property is suitable for the thermoplastic resin of film-molded packing 6X, for example, polyamide of nylon 6, nylon 66 and nylon 12, polycarbonate, polybutylene terephthalate, polyphenylene sulfide, polyetherimide, tetrafluoroethylene, fluororesin, polychloro-trifluoroethylene, polyamidimide, acetylcellulose, cellulose acetate, ethyl cellulose, polyethylene terephthalate, ABC resin, polyethylene, polypropylene, polystyrene, vinyl chloride resin, and ethyl methacrylate.

Film-molded packings 6X shown in FIG. 3 to FIG. 5, FIG. 8 to FIG. 10, each have flat surface portion 6A tightly contacting an inner surface of binding bar 4 in a surface contacting state, and elastic protrusion 6B of hollow shape which protrudes from flat surface portion to a surface of battery stacked block 2 extending so as to surround blowing opening 4D. In film-molded packing 6X, flat surface portion 6A tightly contacts the inner surface of binding bar 4, and elastic protrusion 6B resiliently, tightly contacts the surface of battery stacked block 2, and then leakage of the cooling gas between binding bar 4 and battery stacked block 2 can be prevented.

In battery system 100 shown in FIG. 1 to FIG. 3, side surface plate 4X of binding bar 4 has blowing opening 4D at the inside except for the peripheral portion, and then blowing opening 4D is provided nearly at the whole of binding bar 4. In binding bar 4, peripheral plate portion 4E having a quadrangle shape at the peripheral portion of side surface plate 4X is provided, and then blowing opening 4D is provided inside peripheral plate portion 4E. The outer shape of side surface plate 4X is almost the same as, or to be precise, slightly larger than the outer shape of the side surface of battery stacked block 2. Peripheral plate portion 4E has a shape following the peripheral edge portion of the side surface of battery stacked block 2. As shown in FIG. 4 and FIG. 5, the inner surface of peripheral plate portion 4E is of a flat surface shape, and flat surface portion 6A of film-molded packing 6X is disposed here. Film-molded packing 6X having flat surface portion 6A inside peripheral plate portion 4 E, resiliently presses elastic protrusion 6B to the surface of battery stacked block 2, and then the gap between binding bar 4 and battery stacked block 2, that is, the gap between peripheral plate portion 4 E and battery stacked block 2 is blocked. Thus, leakage of the cooling gas can be prevented.

As shown in the enlarged sectional views of FIG. 4 and FIG. 5, in film-molded packing 6X, the resin film capable to be resiliently deformed is molded in the shape where flat surface portions 6A are coupled to both sides of elastic protrusion 6B. Elastic protrusion 6B has a groove shape to curve the resin film in a U-shape in a sectional view. As shown in FIG. 4 and FIG. 5, flat surface portion 6A of film-molded packing 6X is disposed so as to tightly contact the inner surface of peripheral plate portion 4E. Therefore, flat surface portion 6A of film-molded packing 6X is molded in a quadrangle shape following the inner surface of peripheral plate portion 4E.

Further, film-molded packing 6X shown in FIG. 3, FIG. 4, FIG. 8, and FIG. 10, has guide groove 6C made by molding where side edge 4Y of binding bar 4 is inserted. Film-molded packing 6X of these figures, has guide groove 6C at the side edge portion (the top edge portion in the figures) where first engaging portion 4A provided at the top edge of binding bar 4 as side edge 4Y of binding bar 4 is inserted, and then first engaging portion 4A as side edge 4Y of binding bar 4 is inserted into this guide groove 6C, and flat surface portion 6A of film-molded packing 6X is disposed at the inner surface of peripheral plate portion 4E. The groove extending along side edge 4Y of binding bar 4, is molded as guide groove 6C. In film-molded packing 6X shown in the figures, guide groove 6C is located outside elastic protrusion 6B at the top edge of flat surface portion 6A molded in the flame shape of the quadrangle. In this film-molded packing 6X, as guide groove 6C is provided on the one surface, protrusion bar 6D protruding from the opposite side surface is formed. The inside of protrusion bar 6D is hollow to be guide groove 6C. Guide groove 6C shown in the figures has the groove shape of the approximately U-shape in a lateral sectional view, and the opening edge of the groove is coupled to flat surface portion 6A.

Guide groove 6C is molded so as to have a width and a depth where engaging portion 4A as side edge 4Y of binding bar 4 can be inserted. Further, guide groove 6C of the figures is molded so as to have an entire length where the whole of side edge 4Y of binding bar 4 can be inserted. As shown in a partial enlarged sectional view of FIG. 10, this guide groove 6C includes positioning groove portion 6x having a predetermined width, and fitting groove portion 6y having a narrower width than that of positioning groove portion 6x. The width (d1) of positioning groove portion 6x is larger than a thickness (t) of side edge 4Y so as to smoothly insert side edge 4Y of binding bar 4. The width (d2) of fitting groove portion 6y is approximately equal to, or slightly larger than the thickness (t) of side edge 4Y so as to resiliently clamp side edge 4Y of binding bar 4. Here, the width (d2) of fitting groove portion 6y may be slightly smaller than the thickness (t) of side edge 4Y so as to press-fit and resiliently clamp the side edge of the binding bar 4. Thus, fitting groove portion 6y of the narrow width, resiliently clamps side edge 4Y of binding bar 4. Then, this structure has a feature that side edge 4Y of binding bar 4 inserted into guide groove portion 6C can be held at a fixed position.

In film-molded packing 6X shown in FIG. 10, lower side wall 6a of protrusion bar 6D has a flat surface shape following the undersurface of side edge 4Y of binding bar 4 to tightly contact the undersurface of side edge 4Y. In film-molded packing 6X, upper side wall 6b of protrusion bar 6D is separated by a predetermined interval from the upper surface of side edge 4Y of binding bar 4, and then positioning groove portion 6x having a predetermined width is formed between upper side wall 6b and lower side wall 6a. Then, upper side wall 6b is partially close to the upper surface of side edge 4Y of binding bar 4, and then fitting groove portions 6y having the narrower width than that of positioning groove portion 6x is formed between upper side wall 6b and lower side wall 6a. In film-molded packing 6X shown in the figures, recess portions 6c are provided at plural locations (six portions in FIG. 9) of the upper surface of protrusion bar 6D, and then upper side wall 6b projects into the inner surface side of guide groove 6C by these recess portions 6c to form fitting groove portion 6y. In film-molded packing 6X shown in FIG. 10, the entire length (L1) of positioning groove portion 6x has adequate size, compared with the entire length (L2) of fitting groove portion 6y, and then side edge 4Y of binding bar 4 can be smoothly inserted into guide groove 6C. Film-molded packing 6X mentioned above, has guide groove 6C only at the top edge, but it may have the guide grooves at both edges to guide the engaging portions at both edges of the binding bar.

Further, in battery system 100 shown in FIG. 3 to FIG. 5, vertical portions 23 of peripheral cover portions 21 in spacers 5, are disposed at the upper and lower edge portions of both side surfaces in battery stacked block 2. In film-molded packing 6X, elastic protrusion 6B is resiliently pressed to, and tightly contacts the surfaces of vertical portions 23 of peripheral cover portions 21 in spacers 5 to block the gaps between binding bar 4 and battery stacked block 2. In this battery system 100, cooling gaps 26 are provided between upper and lower vertical portions 23 of peripheral cover portions 21 in spacers 5, and then the cooling gas can be blown into cooling gaps 26 without leakage. However, in the battery system of the present invention, not shown in the figures, the resiliently pressing portion of the packing may directly, tightly contact the surfaces of the battery cells, and then the cooling gas can be blown into the cooling gaps while leakage of the cooling gas is prevented.

In the battery system mentioned above, side edge 4Y of binding bar 4 is inserted into guide groove 6C of film-molded packing 6X, and then film-molded packing 6X is coupled at the preset location of binding bar 4. In this state, flat surface portion 6A of film-molded packing 6X is disposed at the inner surface of peripheral plate portion 4E of binding bar 4. Binding bars 4 coupled to film-molded packings 6X, are coupled to end plates 3 according to the following process steps.

End plates 3 are disposed at both ends of battery stacked block 2 where battery cells 1 and spacers 5 are stacked. Then, resilient plate 9 is put at bottom surface 1B of battery stacked block 2. The jig presses resilient plate 9 to battery stacked block 2, and then resilient arms 19A of resiliently pressing portions 19 in resilient plate 9 are resiliently deformed. In such a state, battery stacked block 2 and resilient plate 9 are inserted between the upper and lower engaging portions 4A, 4B of binding bar 4. At this time, cut-away portions 4a of the engaging portions of binding bars 4 guide the jig. After this, fixing portions 4C of both ends of binding bars 4 are fixed to end plates 3.

The above battery system can be suitable for a power source device supplying power to a motor driving a vehicle. As the vehicle incorporating the battery system, electric vehicles such as hybrid cars or plug-in hybrid cars that are driven by both an engine and an electric motor, or pure electric vehicles that are driven only by an electric motor, can be used. The battery system is used as power sources of these vehicles Here, usages of the battery system of the present invention is not limited to a power source device for a vehicle, it can be used for all usage storing large power, for example, electric power storage devices for storing natural energy such as solar cell power generation or wind power generation, or midnight electric power energy.

The battery system of the present invention can be suitably used in a power source device supplying power to a motor for vehicles requiring large power, or electric power storage devices for storing natural energy or midnight electric power energy.

The invention claimed is:

1. A battery system comprising:
    a battery stacked block having a plurality of battery cells stacked in one direction, and spacers defining a plurality of cooling gaps between the adjacent battery cells, the cooling gaps having openings on respective side surfaces of the battery stacked block;
    end plates at respective ends of the battery stacked block in a stacked direction in which the battery cells are stacked;
    binding bars at respective side surfaces of the battery stacked block, the binding bars being connected to the end plates at respective ends of the binding bars, and having blowing openings configured to communicate with at least a part of the openings of the cooling gaps, each of the binding bars having a side edge projecting from a side surface plate toward the battery stacked block, the side edge being positioned above a terminal surface of the battery stacked block; and
    film-molded packings, each of the film-molded packings being formed from a resin film and having a guide groove configured to receive the side edge of one of the binding bars,
    wherein each of the film-molded packings is between one of the binding bars and the battery stacked block, and
    wherein each of the film-molded packings has a flat surface portion in contact with an inner surface of one of the binding bars in a surface contact state, and an elastic protrusion of a hollow shape which protrudes from the flat surface portion to a surface of the battery stacked block, extending so as to surround one of the blowing openings.

2. The battery system according to claim 1,
    wherein each of the binding bars has a side surface plate which faces one of the side surfaces of the battery stacked block,
    wherein the side surface plate has a peripheral plate portion which is positioned along a periphery of one of the side surfaces of the battery stacked block, and one of the blowing openings is positioned at a center side of the peripheral plate portion, and
    wherein the flat surface portion of one of the film-molded packings is in contact with an inner surface of the peripheral plate portion.

3. The battery system according to claim 2,
    wherein the flat surface portion of one of the film-molded packings is positioned at the peripheral plate portion with the side edge of one of the binding bars received in the guide groove.

4. The battery system according to claim 3,
    wherein the guide groove includes a positioning groove portion having a predetermined width larger than a thickness of the side edge of one of the binding bars, and a fitting groove portion having a narrower width than the predetermined width of the positioning groove portion, and the fitting groove portion is configured to resiliently hold one of the binding bars.

5. The battery system according to claim 1,
    wherein each of the film-molded packings is made such that a sheet of a resin film is molded.

* * * * *